United States Patent [19]

MacGovern et al.

[11] Patent Number: 4,692,027
[45] Date of Patent: Sep. 8, 1987

[54] SPATIAL PROCESSING FOR SINGLE OR DUAL SHEAR WAVEFRONT SENSOR

[75] Inventors: Alan J. MacGovern, Acton; Richard A. Hutchin, Marlboro, both of Mass.

[73] Assignee: Itek Corporation, Lexington, Mass.

[21] Appl. No.: 751,635

[22] Filed: Jul. 3, 1985

[51] Int. Cl.$^4$ ............................................... G01B 9/02
[52] U.S. Cl. ..................................... 356/353; 356/359; 364/525
[58] Field of Search ............... 356/353, 354, 359, 360; 250/201; 364/525, 521

[56] References Cited

U.S. PATENT DOCUMENTS

| | | | |
|---|---|---|---|
| 3,829,219 | 8/1974 | Wyant | 356/353 |
| 3,921,080 | 11/1975 | Hardy | 356/353 X |
| 3,923,400 | 12/1975 | Hardy | 356/353 |
| 4,141,652 | 2/1979 | Feinleib | 250/201 X |
| 4,518,854 | 5/1985 | Hutchin | 356/354 X |

*Primary Examiner*—Davis L. Willis
*Assistant Examiner*—Matthew W. Koren
*Attorney, Agent, or Firm*—Michael H. Wallach; Robert F. Rotella

[57] ABSTRACT

A shearing interferometer produces a matrix of loops of wavefront phase difference vector signals derived from the interferogram indicative of wavefront slopes, where each loop corresponds to a sub-aperture portion of the wavefront under examination. Curl operators are applied to sum the vector signals in one direction about the loops to provide sums which are set equal adjacent loops are identified having such modified sums differing from each other by at least one integer, and in certain cases having modified sums of integers of opposite sign indicative of phase difference measurements greater than the dynamic range of the interferometer, and thus having error components therein. The phase difference values at the boundary of each of such particular identified adjacent loops are operated upon to set the modified sums to zero, to in turn eliminate the error components due to operation of the interferometer outside of the limited dynamic range. Particular edge loops are also identified at the outer edges of the matrix having a positive or negative modified sum, and also having all three loops bounding the particular loops having modified sums of zero. The edge position phase difference values are modified in one or more steps, until the positive or negative modified sums of the particular edge loop are reduced to zero. Eight algorithms for executing the above stated functions are setforth herein.

5 Claims, 13 Drawing Figures

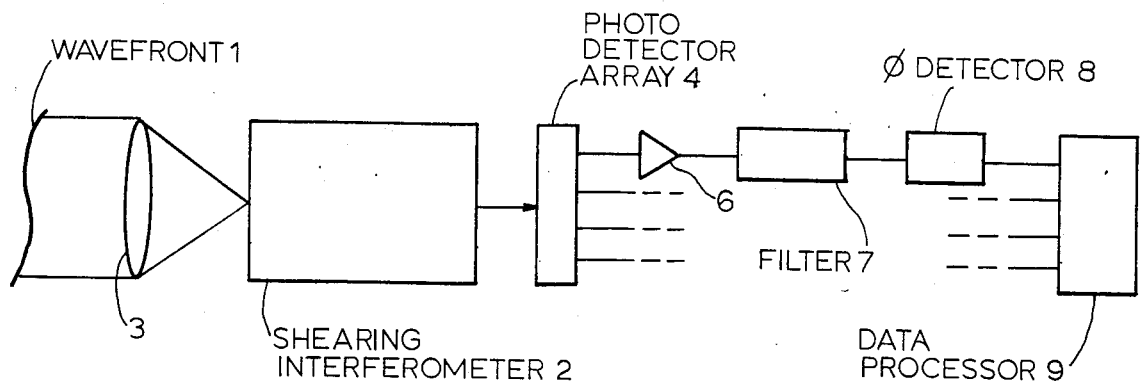
*FIG. 1. PRIOR ART*
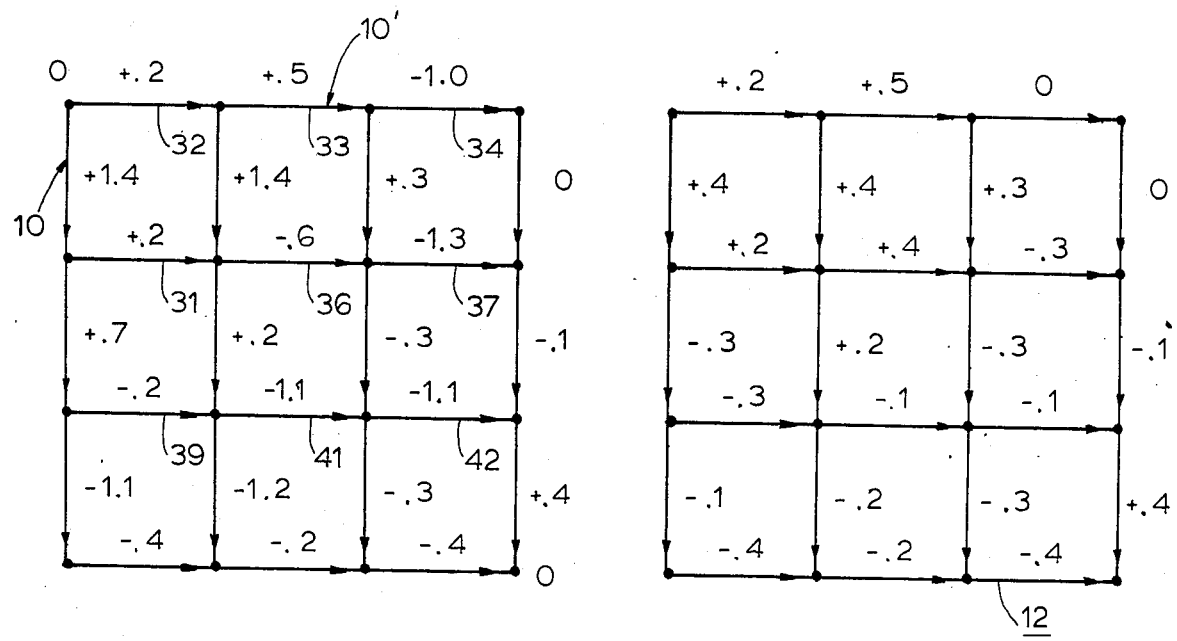
*FIG. 2. PRIOR ART*     *FIG. 3. PRIOR ART*

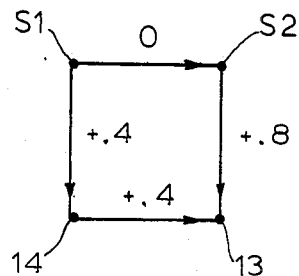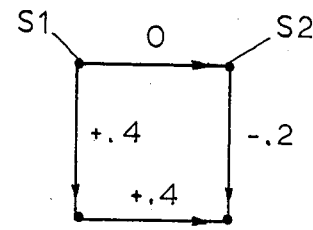
FIG. 4. PRIOR ART    FIG. 5. PRIOR ART
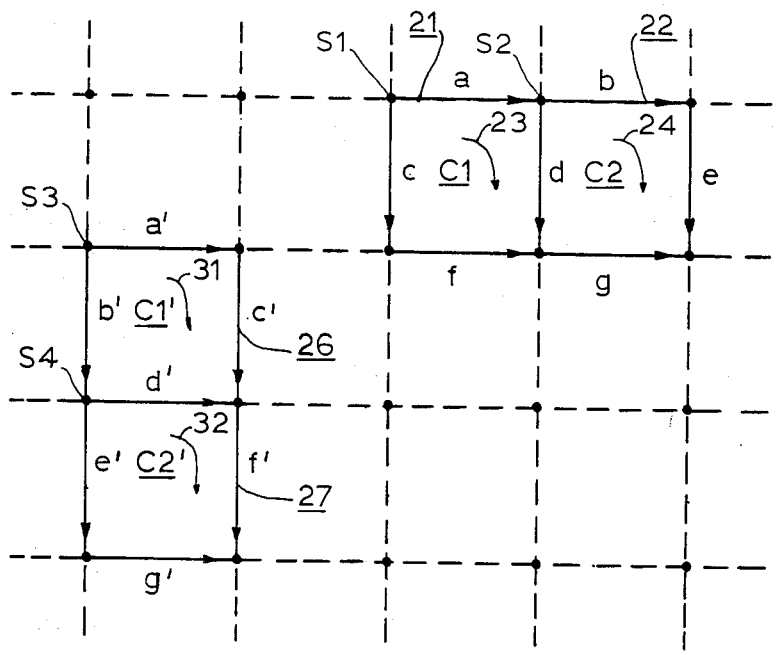
FIG. 6.

SPATIAL PROCESSING FOR SINGLE OR DUAL SHEAR WAVEFRONT SENSOR

BACKGROUND OF THE INVENTION

The present invention relates to wavefront sensors for measuring phase distortions in a wavefront of light.

The resolution of ground based optical imaging systems is limited by random wavefront tilts and phase changes produced by atmospheric turbulence. The resolution of such optical systems is usually limited to about one or two arc seconds by the atmosphere and may be considerably improved if the atmospheric distortion can be measured and corrected in real-time prior to recording of the image on tape or film.

A system for real-time optical wavefront compensation employing discrete components to perform the wavefront sensing and wavefront compensation functions is disclosed in U.S. Pat. No. 3,923,400, issued to John W. Hardy for A Real-Time Wavefront Correction System, which is incorporated by reference herein. In the approach disclosed in this patent, a wavefront being examined is directed onto an AC lateral shearing interferometer which measures in real time the relative phase differences between different portions of the wavefront. The constructional details of a suitable lateral AC shearing interferometer are disclosed in Wyant U.S. Pat. No. 3,829,219 for Shearing Interferometer incorporated by reference herein. The measured phase differences in the form of a first set of electrical signals are then directed to a data processor which generates a second set of electrical signals, the amplitudes of which are proportional to the required phase corrections at the different areas of the wavefront. The second set of signals may be directed to a separate phase corrector element upon which the wavefront is incident to eliminate the relative phase differences of the wavefront. One type of separate phase corrector element disclosed by this patent is an active mirror having an array of electrodistortive elements incorporated therein which function to selectively deform the mirror surface to eliminate phase distortions in the wavefront. The constructional details of an active electrodistortive mirror of this nature are disclosed in U.S. Pat. No. 3,904,274 for Monolithic Piezoelectric Wavefront Phase Modulator incorporated by reference herein.

At other times the shearing interferometer may be employed in the absence of such compensation to measure phase distortion of the wavefront per se, or distortions of an optical system through which the light is passed.

The Wyant interferometer of the '219 patent, is often employed with a shear equal to one sub-aperture. While the results of the measurements are quite accurate, the unambiguous dynamic range of the wavefront sensor is only plus or minus one half of a wavelength per sub-aperture. If the shear is reduced for example to one quarter wavelength per sub-aperture, the unambiguous dynamic range is considerably expanded to typically plus or minus two wavelengths per sub-aperture. However, the resulting set of measurements have far less accuracy, due to the reduced shear. Since a typical phase distortion or tilt in the slope of the wavefront passing through the atmosphere can be plus or minus two wavelengths per sub-aperture or more, it is thus an object of the present invention to provide a method of obtaining, with a single interferometer, both a relatively large dynamic range in the measurements, of at least plus or minus two wavelengths per sub-aperture, and yet retain the accuracy of the large shear interferometer having the restricted dynamic range of plus or minus one half of a wavelength per sub-aperture.

SUMMARY OF THE INVENTION

In accordance with the preferred best mode of practicing the invention, a shearing interferometer produces a matrix of loops of wavefront phase difference vector signals derived from the interferogram indicative of wavefront slopes, where each loop corresponds to a sub-aperture portion of the wavefront under examination. Curl operators are applied to sum the vector signals in one direction about the loops to provide sums which are set equal to the nearest positive or negative integer or zero. Particular adjacent loops are identified having such modified sums differing from each other by at least one integer, and in certain cases having modified sums of integers of opposite sign indicative of phase difference measurements greater than the dynamic range of the interferometer, and thus having error components therein. The phase difference values at the boundary of each of such particular identified adjacent loops are operated upon to set the modified sums to zero, to in turn eliminate the error components due to operation of the interferometer outside of the limited dynamic range. Algorithms are also employed for other "double error" cases not having integers of opposite sign.

Particular edge loops are also identified at the outer edges of the matrix having a positive or negative modified sum, and also having all three loops bounding the particular loops having modified sums of zero. The edge position phase difference values are modified in one or more steps, until the positive or negative modified sums of the particular edge loop are reduced to zero. Preferred algorithms for executing the above stated functions are setforth in the following tables.

Other objects, features and advantages of the present invention will become apparent upon study of the following specific description taken in conjunction with the drawings in which:

FIG. 1 illustrates a prior art arrangement of the AC shearing interferometer means comprising the interferometer proper and associated electronics;

FIGS. 2 and 3 illustrate various prior art matrix configurations of phase difference measurements produced by the interferometer means;

FIGS. 4 and 5 illustrate loops which are helpful in explaining the nature of relative phase shifts of points on a wavefront;

FIG. 6 illustrates portions of the matrix useful in understanding the operation of the algorithms of Tables One and Two;

SPECIFIC DESCRIPTION

Figure 7:
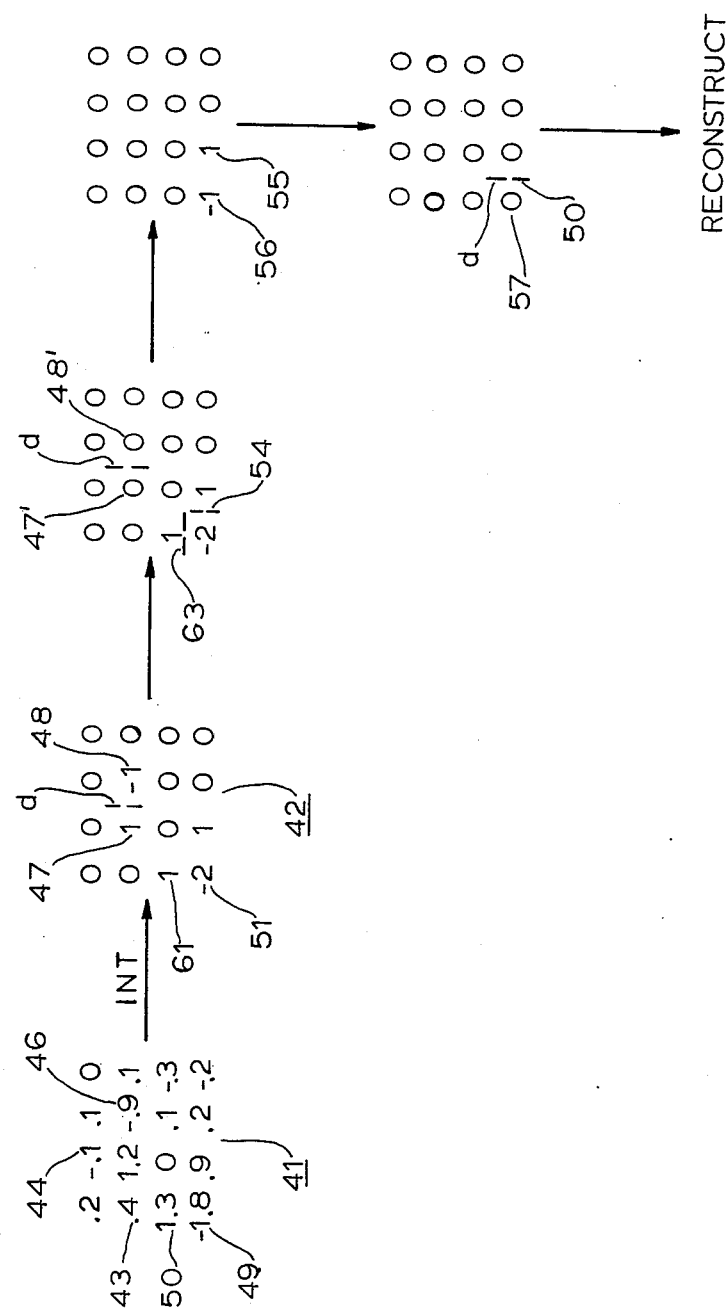
FIG. 7 illustrates the operation of the algorithms upon a matrix of phase difference measurements.

Referring now to FIG. 1, the wavefront 1 to be measured in accordance with the prior art is directed upon the aforementioned shearing interferometer 2 by an optical device such as a telescope represented by lens 3, for producing a shearing interferogram. First and second diffraction gratings, each of which has a spatial frequency slightly different from the other, are positioned in the wavefront. The first diffraction grating produces a first, n order, diffracted beam. The second diffraction grating produces a second, n order, diffracted beam which is angularly displaced relative to the first, n order, diffracted beam, but that has a region of overlap within which the lateral shearing interferogram is produced. The diffracted beams which form the lateral shearing interferogram are first order diffracted beams. Also, the interferometer is used with the wavefront 1 being converged to a focal point and wherein the first and second diffraction gratings are positioned in proximity to the focal point. The above mentioned shearing interferometer 2 described in detail in U.S. Pat. Nos. 3,829,219 and 3,923,400 produces a shearing interferogram of wavefront 1, and further details may be found therein.

The signal detection system for the shearing interferometer includes photo diode array 4 for converting the interferogram into electrical signals which are fed to processor 9 by a number of channels, each including amplifier 6, filter 7 and phase detector 8. Band pass filter 7 is tuned to the modulation frequency of grating motion, and phase detection circuit 8 compares the resulting signal with the phase of a reference signal to produce an analog output signal proportional to the phase difference value, and applied to data processor 9, which performs the required computation to convert the x and y phase difference values from all channels produced by the shearing interferometer, into the required phase correction values for actuating an active mirror element for compensation purposes. The computation is mathematically a matrix inversion followed by a least squares smoothing. Thus components 6, 7 and 8 are repeated for each channel associated with an individual photo diode in the X-Y photo diode array. The manner of operation of these components is fully described in U.S. Pat. No. 3,923,400 of John W. Hardy. The phase shift difference measurements, produced by the interferometer means including unit 2 and its electronic components 6, 7 and 8, are indicative of the wavefront slopes and are manifested in matrix form, also as disclosed in FIGS. 4 and 5 of this patent. See also the Journal of the Optical Society of America, Vol. 67, No. 3, March, 1977, authored by John W. Hardy entitled "Real Time Atmospheric Compensation". In the '400 patent, it is stated in connection with the embodiment described, that the output of each phase detector channel provides unambiguous wavefront difference values up to only plus or minus one half of a wavelength. As mentioned earlier, this produces measurement ambiguity which is resolved in accordance with the present invention.

FIG. 2 illustrates a matrix of loops of theoretical phase difference values which, in the absence of the aforesaid ambiguity or optical noise, result in the sums of each loop being equal to zero. FIG. 3 on the other hand illustrates typical actual measurements. The upper lefthand loop 10 of FIG. 2 is summed by adding plus 0.2 to plus 1.4 and subtracting plus 0.2 and thereafter subtracting +1.4 to equal a sum of zero. The subtraction of the latter two measurements is indicated due to the convention of summing clockwise in a direction against the arrowheads. The loop 10' immediately to the right of the upper lefthand loop 10 will also sum to zero as follows: plus 0.5, plus 0.3, minus (−0.6), minus (+1.4). Thus the first three measurements add to 1.4 algebraically and the last measurement of plus 1.4 is subtracted because we are summing against the direction of the arrow in the manner of the convention illustrated in FIG. 5 of the abovesaid '400 patent. All of the loops in FIG. 2 will sum to zero since they are ideal loops of measurements not subject to optical noise, and not subject to the measurement ambiguity. However, actual measurements will often not produce this result, as may be seen for example by the summing of the loops of 11 and 12 in FIG. 3; the algebraic sums thereof are one rather than zero. Specifically, the sum about loop 11 is +0.2, +0.2, −(−0.3) −(−0.3) = +1; the sum about loop 12 is −0.1, +0.4, −(−0.4), −(−0.3) = +1.

FIG. 4 illustrates a loop having the relative phase shift difference values produced by the interferometer as indicated, the loop corresponding to a sub-aperature of the wavefront under examination.

Assume that the phase shift difference value measured by the interferometer between S-1 and S-2 is zero; thus there is no change in the slope of the wavefront. However, the wavefront ascends out of the plane of the paper by 0.8 wavelengths, and descends in our example toward S-1 as we proceed about the loop between 13 and 14, and 14 and S-1. This is analogous to an airplane taking off from an airfield built at an elevated altitude. If one was to measure altitude changes of the airplane as it flies about, the sum will equal zero when the airplane again lands at the same landing place. Thus in our example as we proceed clockwise about the loop of FIG. 4, we will sum to zero: plus 0.8, minus 0.4, minus 0.4, which will equal zero. The descent from point 13 out of the plane of the paper, back toward the plane of the paper is represented by the negative signs manifest by the arrowheads employed conventionally as indicated.

FIG. 5 however, illustrates an altered measurement of plus 8 which becomes minus 0.2 owing to the above-mentioned interferometer measurement ambiguity. Since the dynamic range in our example is plus or minus one half wavelength (0.5), the 0.8 actual phase difference will be measured as a minus 0.2 as indicated in FIG. 5. The resulting sum of the actual measurement would therefore be zero, minus 0.2, minus 0.4, minus 0.4; which equals minus one rather than zero. The latter two measurements are both −0.4 since we are proceeding against the direction of the arrowhead; −(+0.4) = −0.4. This fact is utilized to detect readings having erroneous components owing to the ambiguity. In accordance with the present invention, the algorithms of Tables One and Two may be employed to detect certain erroneous readings due to measurements extending beyond the dynamic range of the shearing interferometer. Summing is performed by clockwise curl operators $C_1$ and $C_2$ in accordance with the following Table One taken in conjunction with FIG. 6.

ALGORITHM ONE

Curl Operator $C_1 = a + d - f - c$
Curl Operator $C_2 = b + e - g - d$
  Set $C_1$ and $C_2$ to nearest integer.
  $C_1 = -1$, $C_2 = +1$ Indicates error of $-1$ in d.
  $C_1 = +1$, $C_2 = -1$ Indicates error of $+1$ in d.
NOTE: Error signs are reversed for counterclockwise curl operators.

ALGORITHM TWO $C'_1 = a' + c' - d' - b'$.

$C'_2 = d' + f' - g' - e'$.

$C'_1 = -1$, $C'_2 = +1$. Indicates error of $+1$ in $d'$.
$C'_1 = -1$, $C'_2 = -1$. Indicates error of $-1$ in $d'$.
NOTE: Error signs are reversed for counterclockwise curl operators.

Curl operator $C_1$ performs summing in accordance with the algorithm around loop 21, and the sum of the measurements produced by curl operator $C_1$ about 21 will be set to the nearest integer (the modified sum) in accordance with the present invention, and as indicated by Table One. If the nearest integer of $C_1$ is minus one, and plus one for $C_2$ an error of minus one is indicated in the phase shift measurement at the common boundary, namely measurement d, and conversely if $C_1$ is set to the nearest integer of plus one and $C_2$ is set to the nearest integer of minus one, an error of plus one is indicated in the phase shift difference measurement d. Horizontally oriented loop pairs are thus tested by Algorithm One. As indicated in FIG. 6, the summing of loop 21 is performed in the clockwise direction as shown by arrow 23, to produce the $C_1$ measurement, and $C_2$ is applied to loop 22 also in the clockwise direction as indicated by arrow 24. Small letters a through g of Algorithm One correspond to the phase difference values a through g indicated at the righthand portion of FIG. 6. The process is repeated by horizontally scanning all adjacent loops of the matrix to produce indications of errors in all of the phase values d extending in the y direction.

All vertical loop pairs are also scanned and operated on by Algorithm Two. For example, the curl operator $C_1'$ sums the phase values of loop 26, whereas $C_2'$ sums the phase values of loop 27. The small letters a' through g' of the algorithm of Table Two correspond to the small letters a' through g' illustrated at the lefthand portion of FIG. 6. Arrows 31 and 32 illustrate summing in a clockwise direction. However, it may be noted that if $C_1'$ produces a modified sum of minus one, and $C_2'$ produces a modified sum of plus one, this indicates an error of plus one in the d' phase shift value at the common loop boundary, rather than minus one as was the case in connection with the algorithm of Table One.

Thus in accordance with the invention, the sums resulting from the application of the curl operators are set equal to the nearest positive or negative integer or zero. The summing of the vertical loop pairs of FIG. 6 commences from S-3 in the case of the upper loop, and S-4 in the case of the lower loop, whereas the summing of the horizontally oriented loop pairs commences from points S-1 and S-2.

Thus the shearing interferometer means produces a matrix of loops of wavefront phase difference vector measurements derived from the interferogram indicative of wavefront slopes, where each loop corresponds to a sub-aperture portion of the wavefront. The curl operators are applied to sum the vector signals in one direction about the loops to provide sums which are set equal to the nearest positive or negative integer or zero. The steps among others to be described in the preferred method of the invention thus involve identifying those particular adjacent loops of the matrix having the resulting modified sums of integers of opposite sign indicative of phase difference measurements greater than the dynamic range of the interferometer and thus having error components therein, and operating upon each phase shift value or measurement (e.g. d,d') at the boundary of each of such particular adjacent loops until the modified sums are set to zero, to in turn eliminate the error components.

Referring now to FIG. 7, exemplary loop summations are illustrated at 41 for a four by four matrix portion. The top four readings are set equal to the nearest integer or zero, so that the result is four zeros in the first row as illustrated at 42. The 0.4 reading, 43, is set to zero because 0.4 is closer to zero than one. On the other hand, the loop summation at 44 is 1.2, and thus is closer to one than zero, and thus is set to one as indicated at 47. The minus 0.9 measurement 46, is closer to minus one than zero, and thus a minus one is produced at 48. The summation at 49 is minus 1.8, and thus a minus 2 is produced at 51. Adjacent loops 47 and 48 indicate an error measurement since 47 manifests a plus one and 48 a minus one. Referring to Table One, $C_1$ is plus one and $C_2$ is minus one and in accordance with Algorithm One, this indicates an error of plus one in the phase shift measurement d at the boundary between loop 47 and loop 48, which calls for subtracting one from the d phase value measurement at the boundary of the two horizontal loops. As a result of the subtraction of one from the value of d, the summation is changed from plus one, minus one, to zero, zero, as shown at 47' and 48 in FIG. 7.

Algorithm Two would be applied to the adjacent modified sum readings at portions 51 and 61 of the matrix. Since loop 51 is negative ($-2$) with respect to loop 61, an error of minus one rather than plus one is indicated, so that one is added to the d' phase value at 63 to produce a new reading of $-1,0$, shown at 56. Algorithm One then eliminates the $-1$ reading at 56 and the $+1$ reading at 55 by adding one to the phase value d at 50 to produce the 0—0 condition. The process of applying the algorithms continues until all settings have been reduced to zero, as indicated at the lower righthand portion of FIG. 7. As a result, the newly modified phase value measurements, now correctly represent the slope of the wavefront, regardless of the aforesaid ambiguity due to the limited dynamic range of the shearing interferometer. In summary, the FIG. 7 error components are eliminated in accordance with the application of Algorithm One for all loops of the matrix scanned in the horizontal direction, and in accordance with the application of Algorithm Two for all of the same loops of the matrix scanned in the vertical direction. Scanning may be sequential, or parallel processing may be employed for simultaneous examination of the modified loop sums, the latter being included in the term scanning.

Figure 8:
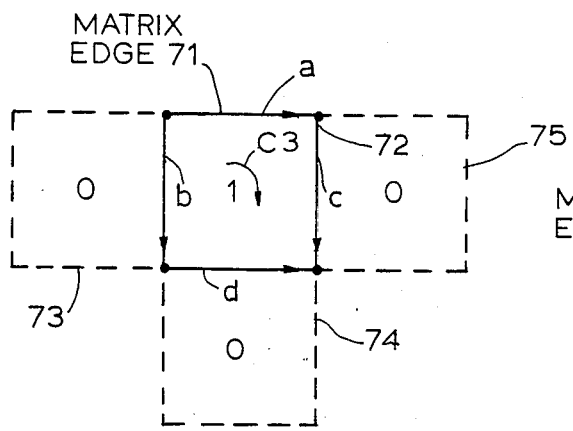
FIGS. 8 and 9 illustrate edge positioned loops which aid in the explanation of the algorithms of Tables Three and Four.

Algorithms One and Two represent certain states of the summation measurements to be identified and corrected. However, other relationships between the modified sums may also be examined in practising the method of the invention. In FIG. 8, loop 72 is an edge loop, that is, a loop at the outer edge 71 of the matrix, and the phase measurement value "a" derived from the interferometer is oriented along matrix edge 71. Should the modified sum integer reading of loop 72 be an integer other than zero, and should the modified sum loop integers of those loops directly bounding 72 be zero, (loop 73, 74 and 75), this particular state (1/0/0/0) indicates that the phase measurement at "a" should be corrected as follows in accordance with Algorithm Three.

ALGORITHM THREE

If loop at a horizontal matrix edge (FIG. 8), has a positive or negative modified sum, and all three neighboring loops are zero:

Curl operator $C_3 = a+c-d-b$.
  Set $C_3$ to nearest integer;
  If $+1$ or $> +1$, then subtract 1 from a;
  If $-1$ or $< -1$, then add 1 to a.
Note: Error signs are reversed for counterclockwise curl operators.

An examination of Algorithm Three indicates that the curl operator applied to loop 72, namely $C_3$, is summed and set to the nearest integer, and if the result or modified sum is plus one or an integer greater than plus one, a one is subtracted from the phase measurement "a" at matrix edge 71. If the modified sum of loop 72 is a negative integer, this calls for adding one to the phase measurement "a" at matrix edge 71, as indicated by Algorithm Three. Curl operator $C_3$ of Algorithm Three is suggested by the arrow $C_3$ in FIG. 8. The process repeats until the positive or negative integers have been reduced to zero.

ALGORITHM FOUR

If loop at a vertical matrix edge (FIG. 9), has a positive or negative modified sum, and all three neighboring loops are zero:
$C_4 = a+c-d-b$.
  Set $C_4$ to nearest integer;
  If $+1$ or $> +1$, then add 1 to b;
  If $-1$ or $< -1$, then subtract 1 from b.
Note: Error signs are reversed for counterclockwise curl operators.

Figure 9:
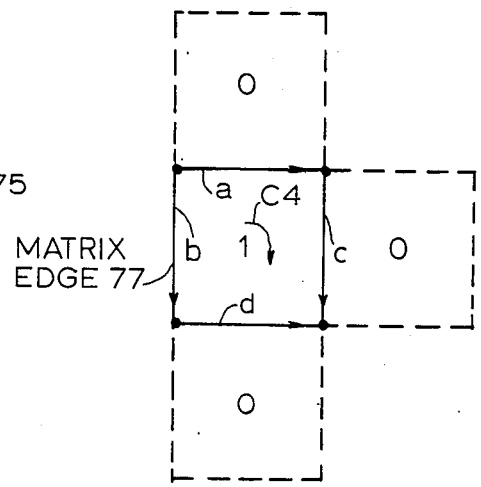

The curl operator $C_4$ of Algorithm Four, is indicated by arrow $C_4$ in FIG. 9, such figure indicating a loop positioned along the vertical matrix edge 77. As in the case of FIG. 8, the phase values are summed and the result is set to the nearest integer. In contrast with Algorithm Three however, it may be noted that Algorithm Four calls for adding one to the phase value "b" at the matrix edge if the nearest integer derived from summation of the edge loop is a plus one or an integer greater than plus one, (and only if the three bounding loops are zero) in contrast with Algorithm Three, calling for the subtraction of one from the edge phase reading if the summed integer is plus one or greater than plus one. If $C_4$ indicates a minus one, and the three bounding loops are 0, the subtraction of one from the edge matrix value is indicated. Thus, in accordance with Algorithms Three and Four, edge loops positioned at the outer edges of the matrix and thus having an edge positioned phase value are scanned or examined and such phase values at the edge of the matrix are corrected until the positive or negative loop integer (modified sum) is reduced to zero. The operation however is not performed unless the three adjacent loops bounding the particular edge loops have modified sums of zero, and the central edge position loops have positive or negative modified sum integers.

Another special case involves the detection during the scanning process of a particular loop having a modifed sum of a positive or negative integer surrounded by four bounding loops having zero modified sums. This indicates that such a condition is produced by noise, and the condition is thus ignored, with the following exception.

Figure 10A:
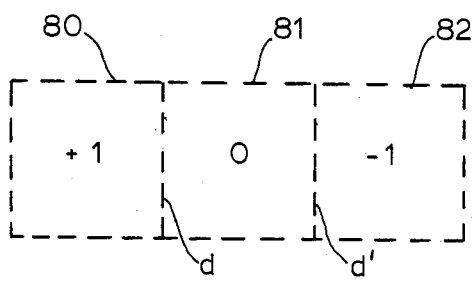
FIGS. 10a, 10b, 11a and 11b illustrate "double error" cases operated on in accordance with algorithms Five, Six, Seven and Eight.
Figure 10B:
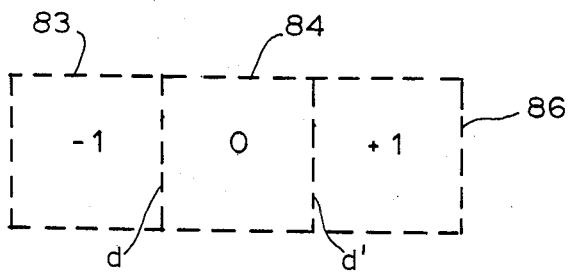

In its broader sense the method of the invention involves identifying particular adjacent loops having modified sums differing from each other by at least one integer. Referring now to FIG. 10a, loop 80 has a modifed sum of plus 1, adjacent loop 81 has a modified sum of 0 and loop 82 adjacent loop 81 has a modified sum of minus 1. This condition indicates that double errors are present, which cancel to produce a modified sum of 0 in the central loop 81. FIGS. 10b illustrates a complimentary situation reflecting the same cancellation of error within the central loop 84 with the left hand loop 83 having a $-1$ modified sum and right hand loop 86 having a $+1$ modified sum. Upon the scanning of the matrix phase values the FIGS. 10a and 10b conditions are identified and the phase values d and d' are operated on in accordance with the algorithms of Table Five and Six to produce the corrected phase values.

ALGORITHM FIVE

If the modified sum of a central loop is zero and the left hand adjacent loop modified sum is positive and the right hand adjacent loop modified sum is negative (FIG. 10a) then subtract one from phase values d and d' at the loop boundaries. Should the positive and negative integers be greater than one repeat until all three loops have a modified sum of zero. For counterclockwise curl operators add one to the phase values.

ALGORITHM SIX

If the modified sum of a central loop is zero and the left hand adjacent loop modified sum is negative and the right hand adjacent loop modified sum is positive (FIG. 10b) then add one to phase values d. and d' at the loop boundaries. Should the positive and negative integers be greater than one repeat until all three loops have a modified sum of zero. For counterclockwise curl operators, subtract one from the phase values.

Thus, a one is subtracted from the phase values d and d' at the loop boundaries of FIG. 10a whereas a one is added to the phase values d and d' at the loop boundaries of FIG. 10b, for clockwise curl operators. As a result of the application of algorithms Five and Six, the positive and negative integers are reduced to zero and the erroneous phase values are corrected. All of the loops in the matrix are horizontally scanned to detect the FIGS. 10a and 10b conditions resulting in correction of the vertically oriented phase values.

Figure 11A:
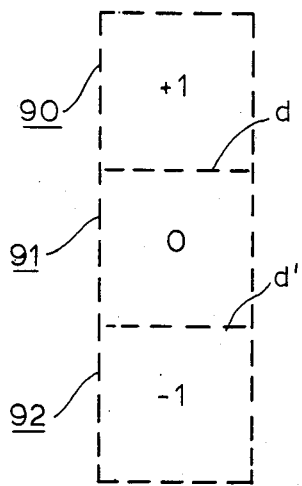
Figure 11B:
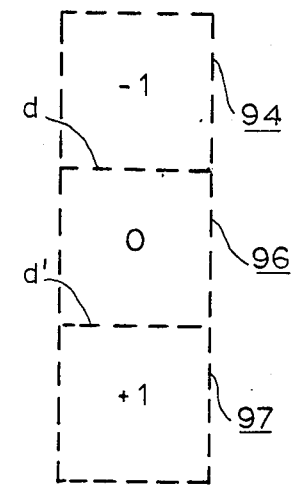

Referring now to FIG. 11a, the central loop 91 is illustrated between upper loop 90 and lower loop 92, loop 90 having a plus one modified sum, loop 91 having a modified sum of zero and the lower loop 92 having a modified sum of minus one. FIG. 11b illustrates the similar situation except that the upper and lower modified sums are reversed in sign. As in the case of the states of FIGS. 10a and 10b, the centrally positioned modified sum of zero indicates a double error. The condition of FIG. 11a is corrected in accordance with algorithm Seven whereas algorithm Eight is applied to the condition illustrated in FIG. 11b.

ALGORITHM SEVEN

If the modified sum of a central loop is zero and the adjacent upper loop modified sum is positive and the adjacent lower loop modified sum is negative (FIG. 11a) then add one to the phase values d and d' at the loop boundaries. Should the positive and negative integers be greater than one repeat until all three loops have a modified sum of zero. For counterclockwise curl operators, subtract one from the phase values.

ALGORITHM EIGHT

If the modified sum of a central loop is zero and adjacent upper loop modified sum is negative and the adjacent lower loop modified sum is positive (FIG. 11b) then subtract one from the phase values d and d' at the loop boundaries. Should the positive and negative integers be greater than one repeat until all three loops have a modified sum of zero. For counterclockwise curl operators, add one to the phase values.

Thus the modified sum of zero at loop 81 indicates the cancellation of a double error in this loop, the zero at central loop 84 also indicating a double error which is reflected by the minus one in loop 83 and the plus one in loop 86. Algorithms Five and Six are applied to the states indicated by FIGS. 10a and 10b to provide corrected phase measurements at the boundaries between the loops. In like manner the modified sum of zero at loop 91 indicates a double error and the analogous correction process of algorithm Seven is applied so that loops 90, 91, and 92 will assume the zero state after correction. Similarly, central loop 96 in FIG. 11b having a modified sum of zero indicates a double error which is corrected by the application of algorithm Eight, until the minus one sum of loop 94 and the plus one sum of 97 revert to the zero state.

Thus the method of the invention in its broader sense involves identifying particular adjacent loops having modified sums differing from each other by at least one integer.

It is to be understood that the aforesaid description relates to the presently preferred steps of carrying out the invention and the invention is thus to be limited only by a reasonable interpretation of the language of the following claims and art recognized equivalents thereof. For example, the term "scanning" is to include both sequential scanning of the loops over a time period or the simultaneous examination of the values associated with the loops in accordance with parallel digital data processing. It is implicit that all algorithms continue to be applied until the modified sums are reduced to zero.

We claim:

1. A method of measuring the shape of a wavefront at an aperture divided into a plurality of subapertures with a wavefront sensor having a limited dynamic range, comprising the steps of:
   a. utilizing said wavefront sensor to produce a map interferogram of said wavefront phase differences;
   b. producing a matrix of loops of wavefront phase difference measurements derived from said wavefront sensor having values indicative of wavefront slopes, each loop corresponding to a subaperture portion of said wavefront;
   c. summing said difference measurements in a particular direction around each of said loops in a closed path to provide closed loop positive or negative sums;
   d. setting each closed loop sum of said sums to a modified sum equal to the nearest positive or negative integer or zero to provide a plurality of modified sums of positive or negative integers; and
   e. utilizing each modified sum produced by step d to measure the slopes of said wavefront.

2. The method of claim 1 wherein step e comprises identifying particular adjacent loops of said matrix having modified sums of said integers of opposite sign indicative of phase difference measurements greater than the dynamic range of said interferometer and thus having error components therein, and operating on each phase difference measurement at the boundaries of each of said particular adjacent loops having said modified sums of opposite sign, to modify said phase difference measurements to eliminate said error components.

3. The method of claim 2 wherein one is added to phase difference measurements at the boundary of adjacent loops indicative of an error of minus one, and one is subtracted from difference measurements of adjacent loops indicative of an error of plus one, until said error components are eliminated.

4. The method of claim 1 wherein step e. includes identifying particular adjacent loops of said matrix having said modified sums differing from each other by at least one integer, and correcting said phase measurements at the boundaries of said adjacent loops until the differences between the modified sums of said adjacent loops are reduced to zero.

5. The method of claim 1, 2, 3 or 4 including identifying particular edge loops positioned at the outer edges of sad matrix and thus having an edge position phase measurement, said particular edge loops having a positive or negative modified sum and also having all loops bounding said particular edge loops having modified sums of zero, and correcting said edge position phase measurements until said positive or negative modified sum of each of said particular edge loops are reduced to zero.

* * * * *